(12) United States Patent
Lucas et al.

(10) Patent No.: US 10,708,627 B2
(45) Date of Patent: Jul. 7, 2020

(54) VOLUMETRIC VIDEO COMPRESSION WITH MOTION HISTORY

(71) Applicant: Intel Corporation, Santa Clara, CA (US)

(72) Inventors: Blake C. Lucas, San Francisco, CA (US); Dmitry Lavrov, Spring, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/292,176

(22) Filed: Mar. 4, 2019

(65) Prior Publication Data
US 2019/0200046 A1  Jun. 27, 2019

(51) Int. Cl.
| | |
|---|---|
| H04N 19/91 | (2014.01) |
| G06K 9/62 | (2006.01) |
| G06K 9/00 | (2006.01) |
| H04N 19/124 | (2014.01) |
| H04N 19/176 | (2014.01) |
| G06T 7/215 | (2017.01) |
| H04N 19/186 | (2014.01) |
| G06K 9/46 | (2006.01) |
| H04N 19/10 | (2014.01) |

(52) U.S. Cl.
CPC ......... *H04N 19/91* (2014.11); *G06K 9/00342* (2013.01); *G06K 9/00369* (2013.01); *G06K 9/00744* (2013.01); *G06K 9/00758* (2013.01); *G06K 9/4652* (2013.01); *G06K 9/6211* (2013.01); *G06T 7/215* (2017.01); *H04N 19/10* (2014.11); *H04N 19/124* (2014.11); *H04N 19/176* (2014.11); *H04N 19/186* (2014.11); *G06T 2207/10028* (2013.01)

(58) Field of Classification Search
None
See application file for complete search history.

(56) References Cited

U.S. PATENT DOCUMENTS

| | | | | |
|---|---|---|---|---|
| 2019/0226852 A1* | 7/2019 | Xie | ...................... | G01C 21/165 |
| 2019/0318497 A1* | 10/2019 | Zhao | ........................ | A61B 5/70 |
| 2019/0355173 A1* | 11/2019 | Gao | .......................... | G06T 7/50 |

OTHER PUBLICATIONS

Biris, O. et al., "Compression of Probabilistic Volumetric Models using multi-resolution scene flow", Image and Vision Computing; vol. 64 (2017): 79-89.
Byrne, J. et al., "VOLA: A Compact Volumetric Format for 3D Mapping and Embedded Systems", GISTAM; 2018.
Github, "Zstandard—Real-time data compression algorithm", retrieved online via https://facebook.github.io/zstd/.
Huang, C. et al., "Human shape and pose tracking using keyframes", Proceedings of the IEEE Conference on Computer Vision and Pattern Recognition; 2014.

(Continued)

*Primary Examiner* — Talha M Nawaz
(74) *Attorney, Agent, or Firm* — Green, Howard, & Mughal LLP

(57) ABSTRACT

Techniques related to pose estimation for an articulated body are discussed. Such techniques may include extracting, segmenting, classifying, and labeling blobs, generating initial kinematic parameters that provide spatial relationships of elements of a kinematic model representing an articulated body, and refining the kinematic parameters to provide a pose estimation for the articulated body.

22 Claims, 10 Drawing Sheets

(56) References Cited

OTHER PUBLICATIONS

Lefebvre, S. et al., "Tiletrees", Proceedings of the 2007 symposium on Interactive 3D graphics and games; ACM 2007.
Moyano, E. et al., "Efficient 3D wavelet transform decomposition for video compression", Proceedings of the Second International Workshop on Digital and Computational Video, 2001; IEEE 2001.
Muller, K. et al., "Predictive compression of dynamic 3D meshes", IEEE International Conference on Image Processing; ICIP 2005; vol. 1; IEEE; 2005.
Varanasi, K. et al., "Temporal surface tracking using mesh evolution", European conference on computer vision; Springer, Berlin, Heidelberg; 2008.
Zhang, J. et al., "Octree-based animated geometry compression", Computers & Graphics; 31.3; (2007): 463-479.

\* cited by examiner

VOLUMETRIC VIDEO COMPRESSION WITH MOTION HISTORY

BACKGROUND

In 2-dimensional (2D) video compression, 2D video may be encoded using only the changes between frames of the 2D video with frame-to-frame motion fields being estimated as part of the encoding process. Such delta frame encoding has been extended to 3-dimensional (3D) video representations and assumes, as with 2D video encode, no knowledge of the underlying motion. However, in some contexts, dense motion fields having semantic meaning are available for 3D video and it may be desirable to perform 3D video encode using such dense motion fields. Furthermore, computational and compression efficiency are ongoing concerns in 3D video compression as time sequenced point clouds (e.g., volumetric video) include large amounts of information. It is with respect to these and other considerations that the present improvements have been needed. Such improvements may become critical as the desire to compress 3D video and, in particular, time sequenced point clouds having corresponding dense motion fields becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
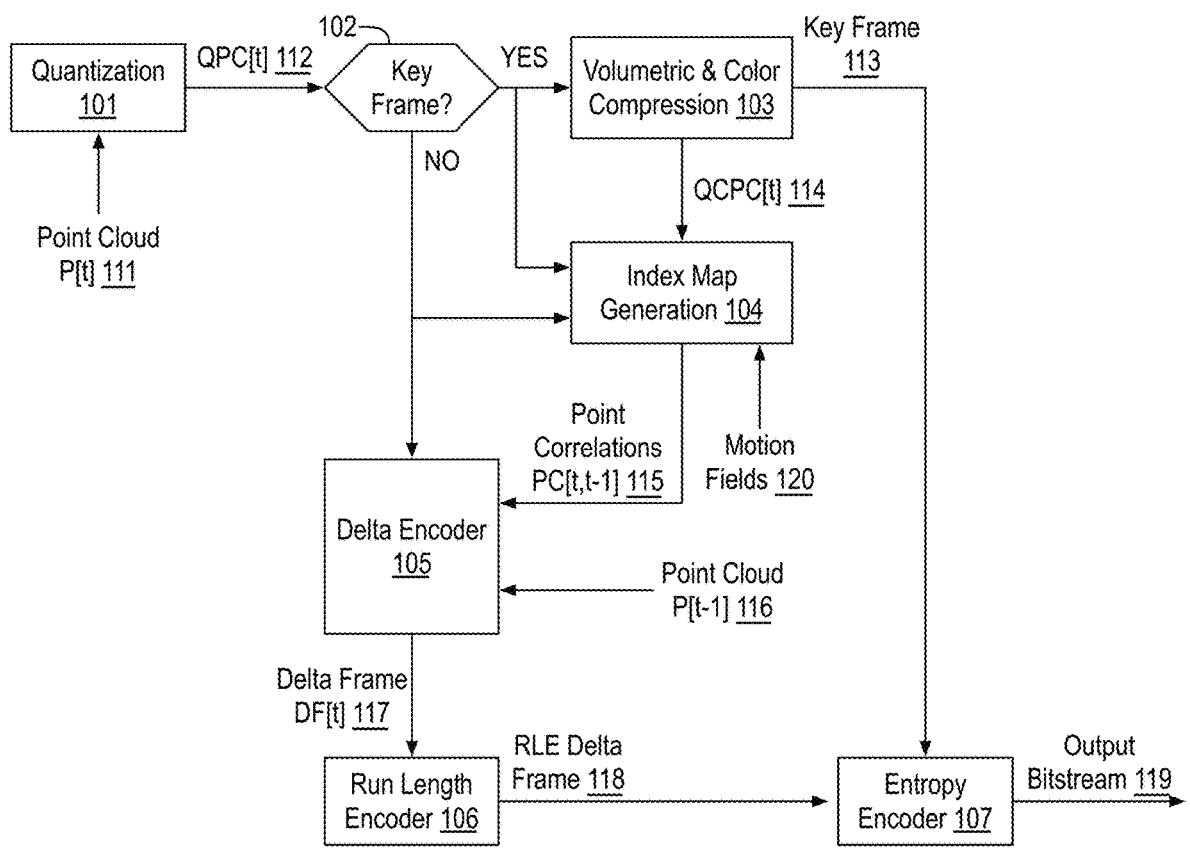
FIG. 1 is an illustrative diagram of an example system for providing 3D video compression.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to volumetric video compression with motion history and, in particular, to encoding delta frames representative of 3D point clouds along with index point correlation differences between the 3D point cloud of the delta frame and the 3D point cloud it references.

As discussed, compression in 3D video involves the compression of large amounts of information. Embodiments herein include generating an index point cloud correlation differences list by differencing index point cloud correlations, which correlate matched index points of temporally adjacent 3D point clouds. The correlated points may correlate points between raw 3D point clouds, quantized versions of such raw 3D point clouds, quantized and volumetric compressions of such raw 3D point clouds, or any other representation of a 3D point cloud. As used herein, the term 3D point cloud indicates any set of data points in space representative of objects in the space. Typically, the 3D point cloud includes points corresponding to surfaces of the objects. Such 3D point clouds may include 3D coordinates corresponding to surface points of objects in the space, along with color values for the point (e.g., RGB information, YUV information, etc.), a normal direction from the surface for the point (e.g., a vector indicating direction normal from the surface), and/or additional information for the point.

As discussed, index point cloud correlations, which correlate points of temporally adjacent 3D point clouds, are received or generated. As used herein, the term index point cloud correlations refers to a data structure that indicates matched points between temporally adjacent point clouds. For example, a particular point of a point cloud at time t−1 may have a match in a point representing the same space at time t such that the index point cloud correlations indicates the match. For example, each point of the point cloud at time t−1 is indexed, each point of the point cloud at time t is also indexed, and the index point cloud correlations includes paired indices of matching points. In some embodiments, each of the index point cloud correlations are differenced (e.g., the index for time t−1 is subtracted from the index for time t, or vice versa) to generate the index point cloud correlation differences list. Notably, the index point cloud correlation differences list may include long runs of zeros or the same numbers when the indexing of each point cloud is performed in the same manner. The index point cloud correlation differences list is then run length encoded to take advantage of such long runs and subsequently entropy encoded to generate a portion of a bitstream representative of 3D video.

Furthermore, a delta frame corresponding to the point cloud at time t, which references a key frame (or reference frame) corresponding to the point cloud at time t−1 is also generated. The delta frame includes delta information with respect to the key frame for correlated points such as color residuals (color differences), location differences, normal vector differences, and differences for any other data for the points. The delta frame may also be run length encoded and subsequently entropy encoded to generate a portion of the bitstream representative of 3D video.

Notably, the point cloud at time t−1 is also volumetrically and color compressed to generate the key frame, which may be entropy encoded (bypassing run length encoding) to generate a portion of the bitstream representative of 3D video. In color compression of the key frame (e.g., compressing color values) and/or the delta frame (e.g., compressing color residual values), the color compression may include determining color values or color residual values for points within a 3D block of the frame, projecting the 3D points onto multiple faces of the 3D block such that each projection combines (e.g., by averaging) points that are aligned orthogonal to the particular face, re-projecting the face projection back to the 3D points (e.g., with those points that were averaged now having less accurate averaged values), and determining an error for each of the three projections/re-projections. When the lowest error is less than a threshold, the corresponding projection is used to compress the color values or color residual values for the points (in a lossy manner). Such compression may use transformation to the frequency domain (and optional quantization) in the 2D space such as discrete cosine transform (DCT) operations to advantageously provide a high level of compression for the color values or color residual values of points within the 3D block. When the lowest error is not less than the threshold, the color values or color residual values for points within the 3D block are encoded without such compression (e.g., the 2D transform is bypassed). It is noted that although discussed with respect to color values or color residual values, any data corresponding to the points of the 3D point cloud may be compressed in such a manner.

The techniques discussed herein provide for high quality and computationally efficient encode and compression of dense motion history for time sequenced point clouds (i.e. volumetric video) using delta frame and entropy encoding. As discussed further herein, key frames are quantized and stored in a volumetrically compressed format. Subsequent frames, which reference the key frame or temporally previous frames, are stored as displacement offsets from the key frame or as displacement offsets from a temporally previous frame. An index mapping that identifies which point in the previous frame matches a point in the current frame is stored as a run-length encoded vector. Notably, the index mapping defines matched points. For example, a motion history between the frames may be used to determine the matched points (e.g., a motion vector from the motion history, which indicates matched points, may be used to define the matched points). The key and delta frames are compressed independently for high-performance compression. The independently compressed frames may be concatenated into one file to form a volumetric video file having high compression and efficient formatting. Color information, if available, may be encoded similarly as an offset from a previous frame. Furthermore, block face projection of color values or color residual values may be used to efficiently compress color information for 3D blocks of the key frame and/or delta frames. Such techniques provide a volumetric video format that can be played back in real-time that preserves the motion history of points between point clouds such that, for example, artistic effects derived from the speed and direction of motion can be added to the visualization. Notably, motion histories, as implemented based on matched points between temporally adjacent point clouds, are an input and not determined by the compression algorithm (e.g., via search) to advantageously preserve motion semantics (e.g., dense motion of limbs, clothing, and hair).

FIG. 1 is an illustrative diagram of an example system 100 for providing 3D video compression, arranged in accordance with at least some implementations of the present disclosure. As shown in FIG. 1, system 100 includes a quantization module 101, a key frame determination module 102, a volumetric and color compression module 103, an index map generation module 104, a delta encoder 105, a run length encoder 106, and an entropy encoder 107. System 100 may be implemented via any suitable device such as, for example, a personal computer, a laptop computer, a server, a cloud computing environment, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

System 100 receives a time series of point clouds P[t] 111 including a current point cloud P[t] 111 and a temporally previous point cloud P[t−1] 116. System 100 may receive any number of temporally adjacent point clouds. Furthermore, for each time instance, the corresponding point cloud may be compressed as a key frame (e.g., without reference to another frame) or as a delta frame (with reference to a key frame or another delta frame). As used herein, a key frame is a frame corresponding to a 3D point cloud and compressed without reference to another frame. Such frames may also be referred to as reference frames or intra frames. As used herein, a delta frame is a frame corresponding to a 3D point cloud and compressed with reference to another frame such that the other frame may be a key frame or a delta frame. Such frames may also be referred to as inter frames. As used with respect to frames and point clouds, the term corresponding to indicates the frame may be decompressed to generate a representation of the 3D point cloud.

The time series of point clouds include any suitable data representative of 3D point clouds. In an embodiment, the time series of point clouds include, for each point thereof, coordinates (e.g., x, y, z values in the space) corresponding to surface points of objects in the space along with luma or color values for the point (e.g., only Y information or RGB information, YUV information, etc.). The time series of point clouds may also include, for each point thereof, a normal direction from the surface for the point (e.g., a vector indicating direction normal from the surface) and/or additional information (e.g., metadata) for the point.

System 100 also receives, relative to the sequence of 3D point clouds, dense motion fields 120 representative of motion of the 3D point clouds over time. Notably, system 100 does not generate motion fields between point clouds using search techniques during encode. The dense motion fields may be generated or attained using any suitable technique or techniques. For example, the motion fields may be generated during 3D rendering, during 3D image capture, or even hand drawn. Motion fields 120 may include any information indicative of motion between 3D point clouds such as data indicating matching points and, for each set of matching points, a motion vector (e.g., a 3D motion vector) indicating motion of the point from time t−1 to time t. It is noted that motion fields 120 may indicate motion relative to time series of point clouds 111 (e.g., raw point clouds) or relative to quantitation and/or volumetric compressions of such time series of point clouds 111. For example, motion fields 120 may include index maps indicating, for a current point cloud P[t], which point in the previous point cloud P[t−1] corresponds thereto. As used herein, with respect to point cloud points, the terms correspondence or match are used interchangeably and indicate the points are of the same point on an object. It is noted that such matches may include inadvertent inaccuracies.

As shown, for a current point cloud P[t] 111, quantization module 101 quantizes the information of current point cloud P[t] 111 to generate a quantized current point cloud P[t] 112. Such quantization may be performed using any suitable technique or techniques and it may be applied to any information of the current point cloud P[t] 111 such as the coordinates corresponding to surface points of current point cloud P[t] 111, luma or color values for the points, etc. Quantized current point cloud P[t] 112 is received by key frame determination module 102, which determines whether quantized current point cloud P[t] 112 is to be coded as a key frame or a delta frame. Such a determination may be made using any suitable technique or techniques. In an embodiment, a first frame is a key frame and every $n^{th}$ frame is also a key frame such that key frames are distributed periodically. In an embodiment, a controller determines frame change data or the like and indicates a new key frame when the frame change data exceeds a threshold.

When quantized current point cloud P[t] 112 is to be coded as a key frame, processing continues at volumetric and color compression module 103, which volumetrically compresses quantized current point cloud P[t] 112 and performs color compression to generate a key frame 113. Such volumetric and color compression may be performed using any suitable technique or techniques such as compression into a VOLA compact data structure as described in Byrne, Jonathan, et al. "VOLA: A Compact Volumetric Format for 3D Mapping and Embedded Systems." *GISTAM*. 2018. In some embodiments, the volumetric compression includes re-sampling quantized current point cloud P[t] 112 to an octree such that each node of the octree is stored as a 64 bit mask with each bit representing a voxel in a 4×4×4 cube. Resolution of leaf nodes may be selected to be less (e.g. half) the target point cloud precision. Color information may be stored in a separate array and assigned to each voxel in correspondence with breadth or depth first traversal of the octree. Furthermore, color information (e.g., color values of points of quantized current point cloud P[t] 112) may be compressed using 3D block face projection techniques as discussed further herein and, in particular, with respect to FIG. 6. As shown, key frame 113 is compressed using entropy encoder 107 to generate a portion of output bitstream 119. Entropy encoder 107 may apply, for any input data, any suitable entropy encoding techniques (e.g., lossless data compression independent of the specific characteristics of the input data) to any suitable file format such as zip, lzf, lzma, lz4, etc.

Since quantized current point cloud P[t] 112 is being coded as a key frame, it may not have a corresponding index map for points thereof. As used herein, the term index map indicates an indexing (e.g., applying an index value to each point) of a point cloud, quantized point cloud, etc. As shown, a quantized and compressed point cloud P[t] 114 corresponding to quantized current point cloud P[t] 112 is provided to index map generation module 104, which indexes the points of quantized and compressed point cloud P[t]. In an embodiment, the indexing is performed using nearest neighbor techniques such that, from a particular starting point, the indexing traverses nearest neighbors of the quantized and compressed point cloud P[t] to provide an index value to each point of quantized and compressed point cloud P[t].

Figure 2:
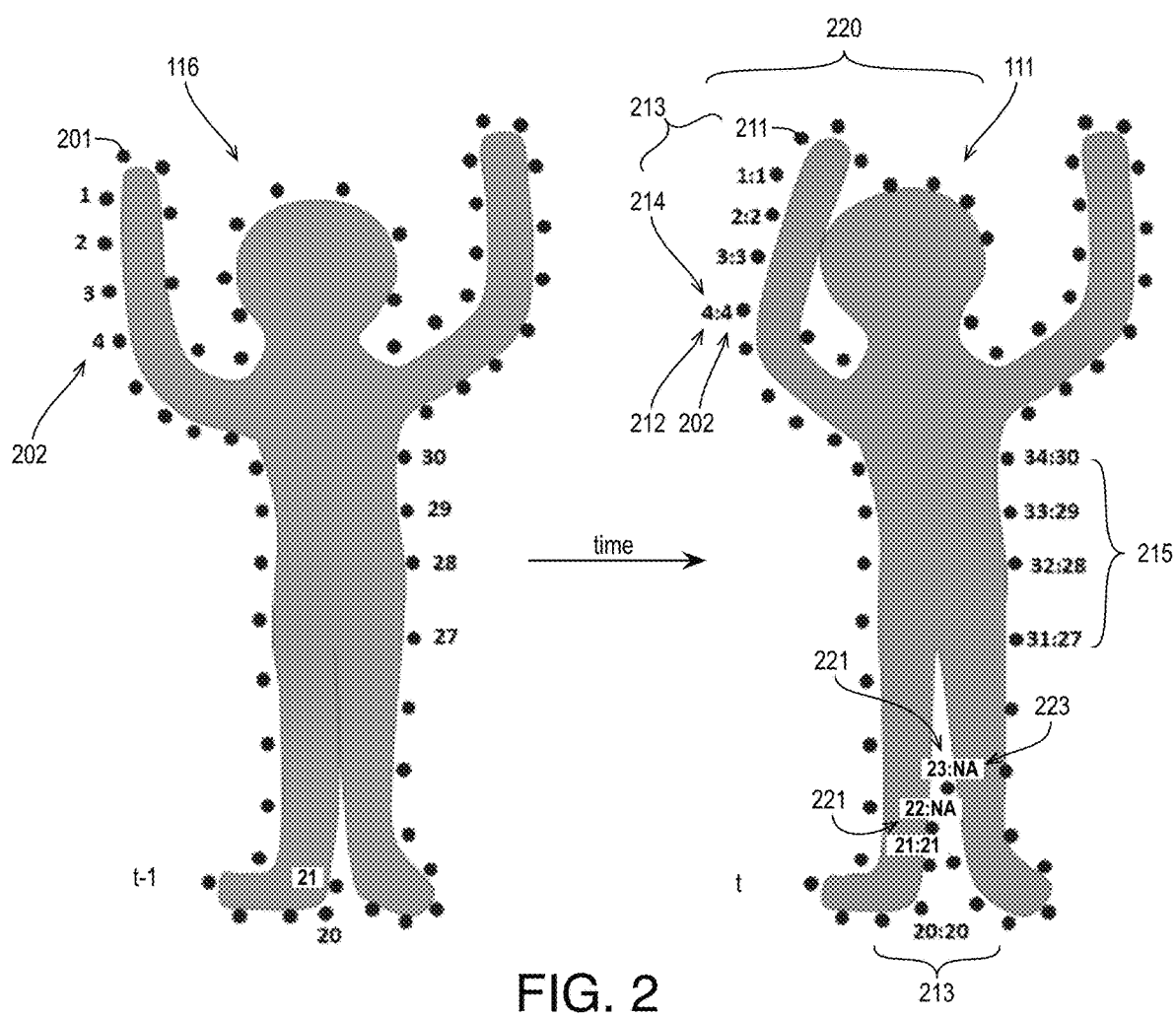
FIG. 2 illustrates an example indexing of a time series of point clouds.

FIG. 2 illustrates an example indexing 200 of a time series of point clouds, arranged in accordance with at least some implementations of the present disclosure. As shown in FIG. 2, for point cloud P[t−1] 116, which may correspond to a key frame in the illustrated example, each point 201 thereof is indexed with an index value 202. For example, index values 202 may be characterized as key frame index values when corresponding to a delta frame. In FIG. 2, only some of points 201 are indexed (e.g., indexed points 1, 2, 3, 4, 20, 21, 27, 28, 29, 30) for the sake of clarity of presentation. Furthermore, although illustrated with respect to point cloud P[t−1] 116 for the purposes of clarity and generality, any quantized, quantized and compressed, etc. of point cloud P[t−1] 116 (e.g., a quantized and compressed point cloud such as quantized and compressed point cloud 114) may be indexed. FIG. 2 also illustrates a temporally subsequent point cloud point cloud P[t] 111, which may correspond to a delta frame as discussed further herein below.

Returning to FIG. 1 and key frame determination module 102, when quantized current point cloud P[t] 112 is to be coded as a delta frame, processing continues at index map generation module 104. Notably, delta frames are also offset to the volumetric compression format provided by volumetric and color compression module 103 (e.g., an octree approximation). At index map generation module 104, the point correlations provided by motion fields 120 are translated to the volumetric compression format to generate point correlations PC[t, t−1] 115 that provides a data structure that indicates matching points between point clouds in the volumetric compression format. That is, motion fields 120, which indicate matching points in the raw point cloud format are translated to point correlations PC[t, t−1] 115, which indicate matching points in the volumetric format. It is noted that, with respect to the raw point cloud format, points are quantized and compressed such that points may be moved, combined, etc. between formats. Index map generation module 104 maintains point correlations between such formats. In an embodiment, each point of the current 3D point cloud corresponds to a quantized and coded point of a first raw 3D point cloud and each point of the previous 3D point cloud also corresponds to a quantized and coded point of a second raw 3D point cloud as provided by quantization module 101 and the volumetric coding performed by volumetric and color compression module 103.

Returning to FIG. 2, for point cloud P[t] 111, which corresponds to a delta frame in the illustrated example, each point 211 thereof is indexed with an index value 212. For example, index values 212 may be characterized as key frame index values when corresponding to a key frame. Furthermore, index point correlations 214 are provided between matching ones of index values 212 (i.e., index values of point cloud P[t] 111) and index values 202 (i.e., index values of point cloud P[t−1] 116). All of such index point correlations 214 are then listed in an index point correlation mapping 220. As used herein, the term index point correlation mapping 220 indicates a data structure that matches index points in a first point cloud to index points in a second point cloud such that the matching is an actual matching of representations objects in the point cloud (e.g., a corner of building is represented by both points, a finger tip is represented by both points, etc.). As discussed below, index point correlation mapping 220 includes index point correlations 214 matching one of index values 212 with a matching one of index values 202 (or indicating no match if the mapping is injective). For example, index point correlation mapping 220 may provide an injective mapping between point clouds 111, 116 such that index point correlation mapping 220 never maps multiple index values of point cloud P[t] 111 to the same point of point cloud P[t−1] 116.

For example, index value 1 of index values 212 matches index value 1 of index values 202, index value 2 of index values 212 matches index value 2 of index values 202, index value 3 of index values 212 matches index value 3 of index values 202, index value 4 of index values 212 matches index value 4 of index values 202, index value 20 of index values 212 matches index value 20 of index values 202, index value 21 of index values 212 matches index value 21 of index values 202, index value 22 of index values 212 has no match in index values 202 (NA), index value 23 of index values 212 has no match in index values 202 (NA), index value 31 of index values 212 matches index value 27 of index values 202, index value 32 of index values 212 matches index value 28 of index values 202, index value 33 of index values 212 matches index value 29 of index values 202, index value 34 of index values 212 matches index value 34 of index values 202, and so on. Index point correlation mapping 220 then includes a listing of all such index point matches.

Notably, the provided format indicates index point correlations A:B such that index value A represents a particular point of point cloud P[t−1] 116 (from index values 212) and index value B represents a matched point of point cloud P[t] 111 (from index values 202). As indicated by index point correlations having equivalent index values 213, some index values between points of point cloud P[t−1] 116 and points of point cloud P[t] 111 are matching (e.g., the index values are the same). For example, for equivalent index values 213 (i.e., a subset of index point correlations of index point correlations 214), the pertinent index value 212 and matching index value 202 are equivalent index values. As indicated by index point correlations having differing index values 215, some index values between points of point cloud P[t−1] 116 and points of point cloud P[t] 111 differ (e.g., the index values are different). For example, for differing index values 215 (i.e., a subset of index point correlations of index point correlations 214), the pertinent index value 212 and matching index value 202 are different index values. Furthermore, as indicated by index point correlations with no match index values 221, some index values for points of point cloud P[t−1] 116 indicate no matching (e.g., NA, not applicable or no match). For example, for no match index values 221, index value 202 has no match and instead matched with a particular value indicative of no matching point in point cloud P[t−1] 116. Notably, motion fields 120 typically represent motion trajectories for 3D objects such that point mappings between time instances are not one to one as surfaces are occluded, exposed, etc. Herein, in index point correlations 214, such points of point cloud P[t] 111 that do not have matches in point cloud P[t−1] 116 are indicated by a particular number (labeled a magic number) that cannot be an index value and indicates no match. The corresponding point cloud information for such points is compressed without reference to a point in point cloud P[t−1] 116.

Returning to FIG. 1, point correlations PC[t, t−1] 115, which indicate, using the discussed index values, matching point correlations, are provided to delta encoder 105. Delta encoder 105 also receives quantized current point cloud P[t] 112 or a current quantized and compressed point cloud corresponding thereto, which in the current example corresponds to a delta frame, previous point cloud P[t−1] 116, a previous quantized point cloud, or a previous quantized and compressed point cloud, which in the current example corresponds to a key frame or previous delta frame. That is, delta encoder 105 receives a current point cloud and a previous point cloud in compatible formats (e.g., quantized and compressed) and point correlations therebetween that indicate matching points of the point cloud.

Delta encoder 105 then determines delta information between the point clouds in the matching format and for the discussed point correlations PC[t, t−1] 115. For example, the delta information, which is characterized as a delta frame, may include, for matching points of the point clouds: changes in spatial positions (which may be characterized as motion vectors), changes in luma values or changes in color values (which may be characterized as luma or color residual values), changes in the normal vector, or other delta information. Furthermore, the delta information or delta frame includes a compression of point correlations PC[t, t−1] 115. By encoding both the delta information for the points and the point correspondences, the current point cloud can be reconstructed from the previous point cloud. Notably, for a particular point cloud point of the current point cloud, point correlations PC[t, t−1] 115 (after decode) indicate a matched point in the previous point cloud, which has all relevant information (e.g., spatial location, color, normal vector, etc.). By adding the delta information, all such information can then be reconstructed for the point of the current point cloud. For example, delta frame DF[t] 117 may include point-wise differences for spatial location, color, normal vector and an indication of the matching point (by index) in the previous frame.

Figure 3:
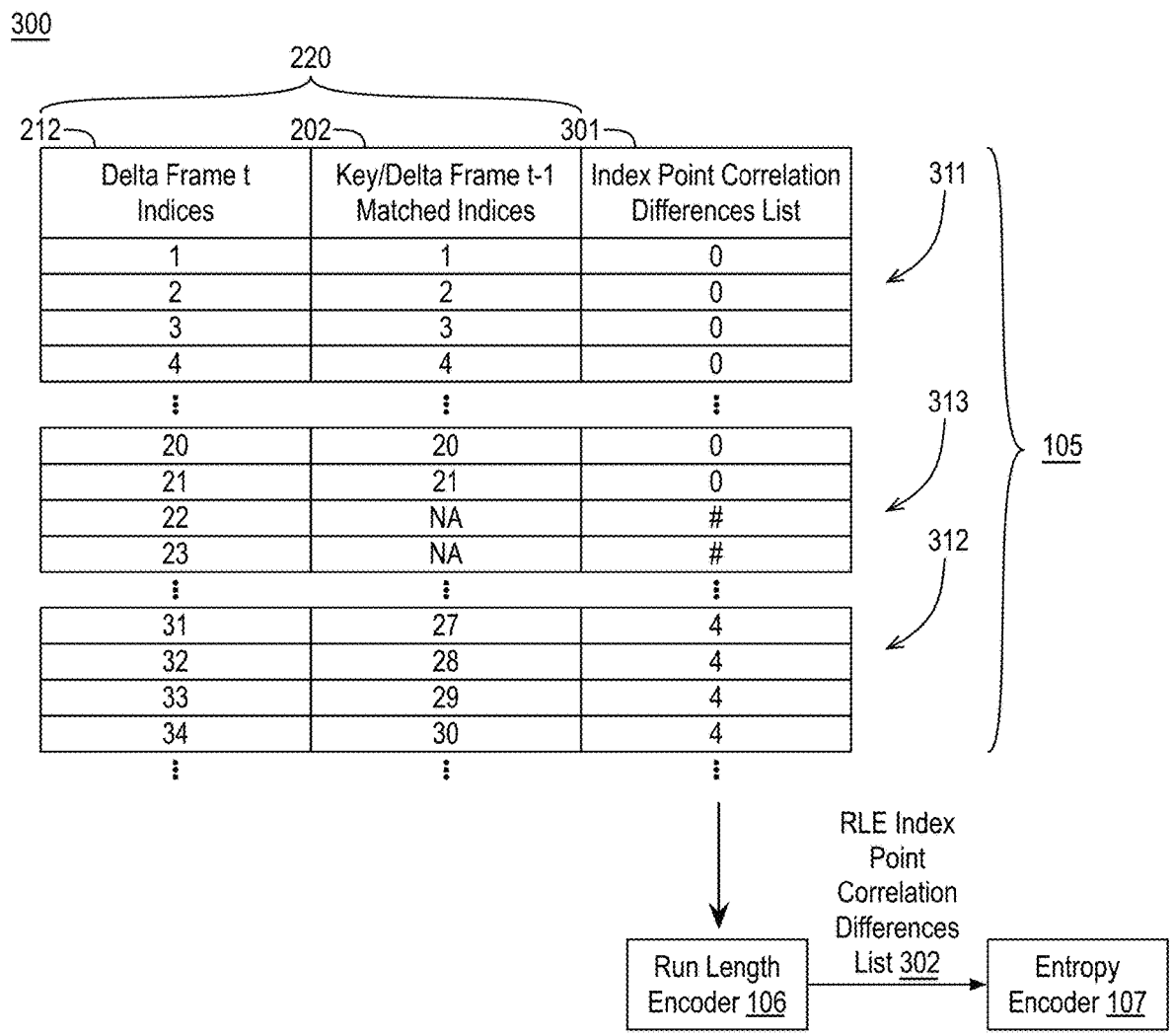
FIG. 3 illustrates an example encoding of exemplary index point correlation mapping.

FIG. 3 illustrates an example encoding 300 of exemplary index point correlation mapping 220, arranged in accordance with at least some implementations of the present disclosure. As shown in FIG. 3, index point correlation mapping 220 may be provided as a paired listing of index values 212 (i.e., index values of point cloud P[t] 111) and index values 202 (i.e., index values of point cloud P[t−1] 116) such that, as discussed, matching indices correspond to actual point cloud matches.

As shown, in an embodiment, to encode index point correlation mapping 220, delta encoder 105 differences, in an index correlation pairwise manner, index values 212 and index values 202 to generate an index point correlation differences list 301. As used herein, an index point correlation differences list indicates a data structure providing pairwise differences between matched index values of point clouds. The elements of the index point correlation differences list may be characterized as index value differences.

Notably, index point correlation differences list 301 includes runs of difference values that are zero and runs of difference values that have the same difference values. For example, as shown with respect to zero run 311, index point correlation differences list 301 includes a run of any number of zeros due to the indexing of point cloud P[t] 111 matching the indexing of point cloud P[t−1] 116 from the starting points thereof. For example, with reference to FIG. 2, index point correlations 214 (1:1, 2:2, 3:3, 4:4, . . . 20:20, and 21:21) illustrate example index point correlations that have matching index values. Such indexing matches may occur relatively frequently as the point clouds may represent solid objects going through relatively predictable motion and the starting point of indexing of the point clouds may be matched. For example, generation of index point correlation differences list 301 may take advantage of such characteristics of 3D video for improved compression along with the provision of dense motion fields as discussed herein. In an embodiment, when motion from point cloud P[t−1] 116 to point cloud P[t] 111 is bijective (i.e., each index value of index values 202 is paired with exactly one index value of index values 212), index point correlation differences list 301 is zero for all instances.

Furthermore, index point correlation differences list 301 includes runs of differences that are of the same difference value. For example, as shown with respect to same value run 312, index point correlation differences list 301 includes a run of any number of the same value (in this example, a difference value of 4) due to the indexing of a portion of point cloud P[t] 111 matching the indexing of a portion of point cloud P[t−1] 116. For example, when indexing portions of each of point cloud P[t] 111 and point cloud P[t−1] 116, although a starting point match may be offset, so long as the subsequent indexing of matched points matches for a stretch of matched points, the difference values in index point correlation differences list 301 will match. For example, with reference to FIG. 2, index point correlations 214 (31:27, 32:28, 33:29, 34:30) illustrate example index point correlations that have a run of matching index value differences. For example, if a contiguous section of index values removed with respect to point cloud P[t] 111, then subsequent points will have the same index value difference, making the data set ideal for run-length encoding. Such matching index value differences may also occur relatively frequently and the generation of index point correlation differences list 301 may take advantage of such runs for improved compression along with the provision of dense motion fields as discussed herein. Furthermore, index point correlation differences list 301 includes runs 313 of a particular selected value (indicated with a #) that indicates index values 212 corresponding thereto has no match. Such runs may also be contiguous as portions of point cloud P[t] 111 are newly revealed or occurring at the particular time instance.

As shown in FIG. 3, index point correlation differences list 301, as generated by delta encoder 105, is provided to run length encoder 106, which run length encodes index point correlation differences list 301 to generate run length encoded (RLE) index point correlation differences list 302. RLE index point correlation differences list 302 is then entropy encoded by entropy encoder 107 and included as a portion of output bitstream 119. As used herein, the term run length encoding indicates lossless data compression where runs of values (e.g., sequences having the same value) are encoded as a single value and a count of the number of values. Such run length encoding may be contrasted with entropy encoding where, for example, codewords are provided for each unique symbol in the input data and the symbols are replaced with the codewords.

Figure 4:
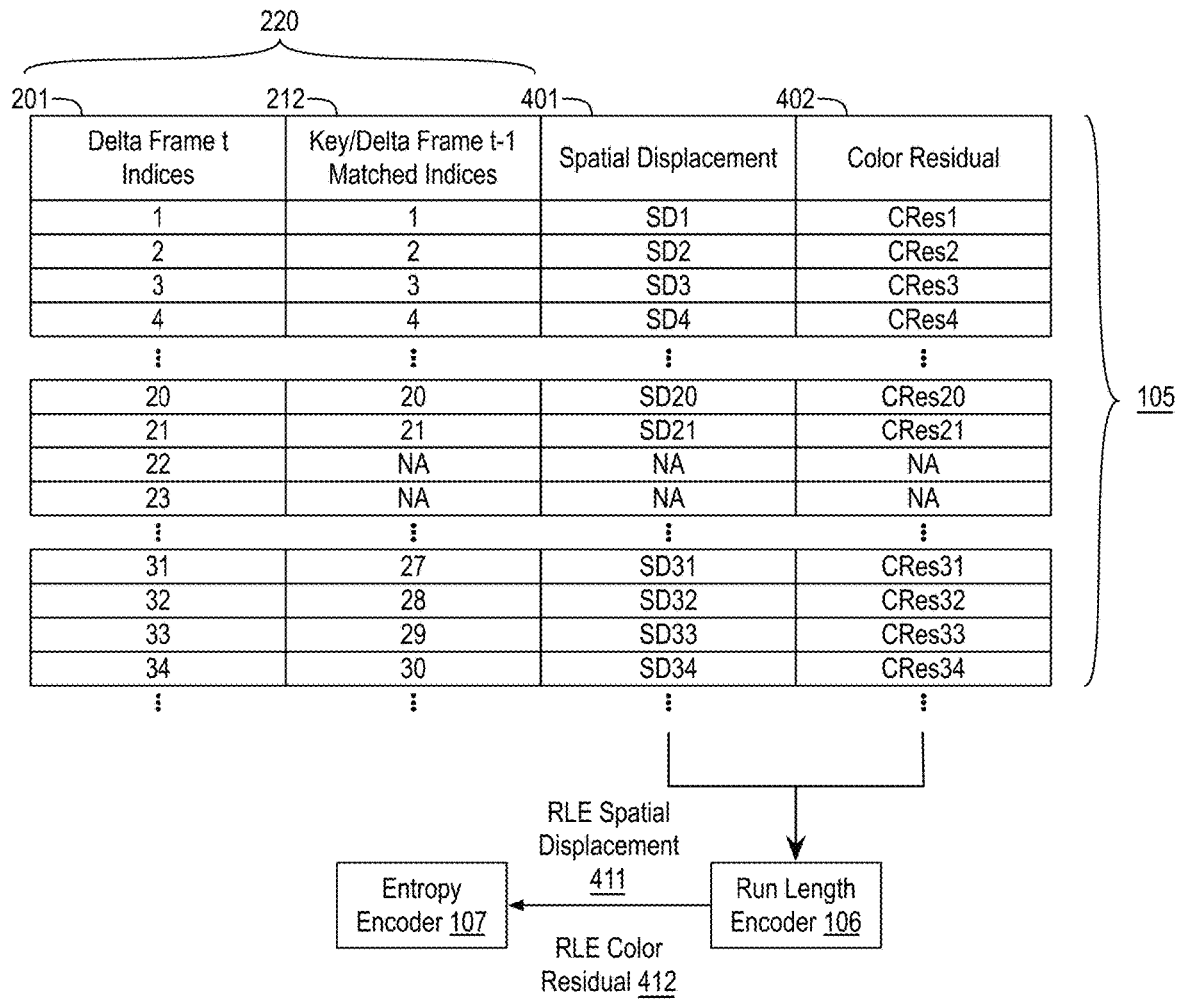
FIG. 4 illustrates an example encoding of exemplary delta information including spatial displacement data and color residual values.

FIG. 4 illustrates an example encoding 400 of exemplary delta information including spatial displacement data and color residual values, arranged in accordance with at least some implementations of the present disclosure. As shown in FIG. 4, index point correlation mapping 220 may be provided as a paired listing of index values 212 (i.e., index values of point cloud P[t] 111) and index values 202 (i.e., index values of point cloud P[t−1] 116) such that, as discussed, matching indices correspond to actual point cloud matches.

Furthermore, delta encoder 105 determines for matched points, one or more delta information values such as spatial displacement values 401 and color residual values. In an embodiment, spatial displacement values 401 are generated by retrieving the spatial position of a point indicated by one of the index values in paired listing of index values 212, retrieving the spatial position of the matching point indicated by the matching index value in paired listing of index values 212, and differencing the spatial positions (e.g., spatial displacement is $\Delta x = x_t - x_{t-1}$, $\Delta y = y_t - y_{t-1}$, $\Delta z = z_t - z_{t-1}$ where x, y, and z are spatial coordinates).

Similarly, color residual values 402 may be generated by retrieving the color value of a point indicated by one of the index values in paired listing of index values 212, retrieving the color value of the matching point indicated by the matching index value in paired listing of index values 212, and differencing the color values (e.g., color residual values 402 is $\Delta R = R_t - R_{t-1}$, $\Delta G = G_t - G_{t-1}$, $\Delta B = B_t - B_{t-1}$ where R, G, and B are RGB color channels, although any color space such as YUV or luma only may be used). Color residual values 402 may be in any format. In an embodiment, color residual values 402 are in a 24 bit RGB differences format. In an embodiment, color residual values 402 are in a 16 bit YUY2 format. Other delta information, such as differences between normal vectors or differences between certain metadata may be determined in a similar manner.

Notably, spatial displacement values 401 and color residual values 402 may have runs of zeros (for no motion or no color change, respectively) and runs of the same values (for consistent motion in all or parts of a point cloud or for changes in lighting, respectively), that may be advantageously run length encoded. For example, if there is no displacement change due to no motion or consistent motion of objects in the 3D space, then entropy encoding will exploit this redundancy. Furthermore, if there are no color changes because points are truly in correspondence, then the difference will be zero and entropy encoding schemes will again exploit the redundancy.

As shown in FIG. 4, spatial displacement values 401 and/or color residual values 402, as generated by delta encoder 105, are provided to run length encoder 106, which run length encodes spatial displacement values 401 and/or color residual values 402 to generate RLE spatial displacement values 411 and/or RLE color residual values 412. RLE spatial displacement values 411 and/or RLE color residual values 412 are then entropy encoded by entropy encoder 107 and included as portion(s) of output bitstream 119.

Returning to FIG. 1, as discussed, run length encoder 106 generates one or more of RLE index point correlation differences list 302, RLE spatial displacement values 411, and RLE color residual values 412, which may be collectively characterized as RLE delta frame 118. RLE delta frame 118 is then entropy encoded by entropy encoder 107 to generate a portion or portions of output bitstream 119. As discussed with respect to volumetric and color compression module 103, point cloud point clouds 111 or quantized point clouds 112 may be volumetrically compressed. Such compression may be at any resolution.

Figure 5:
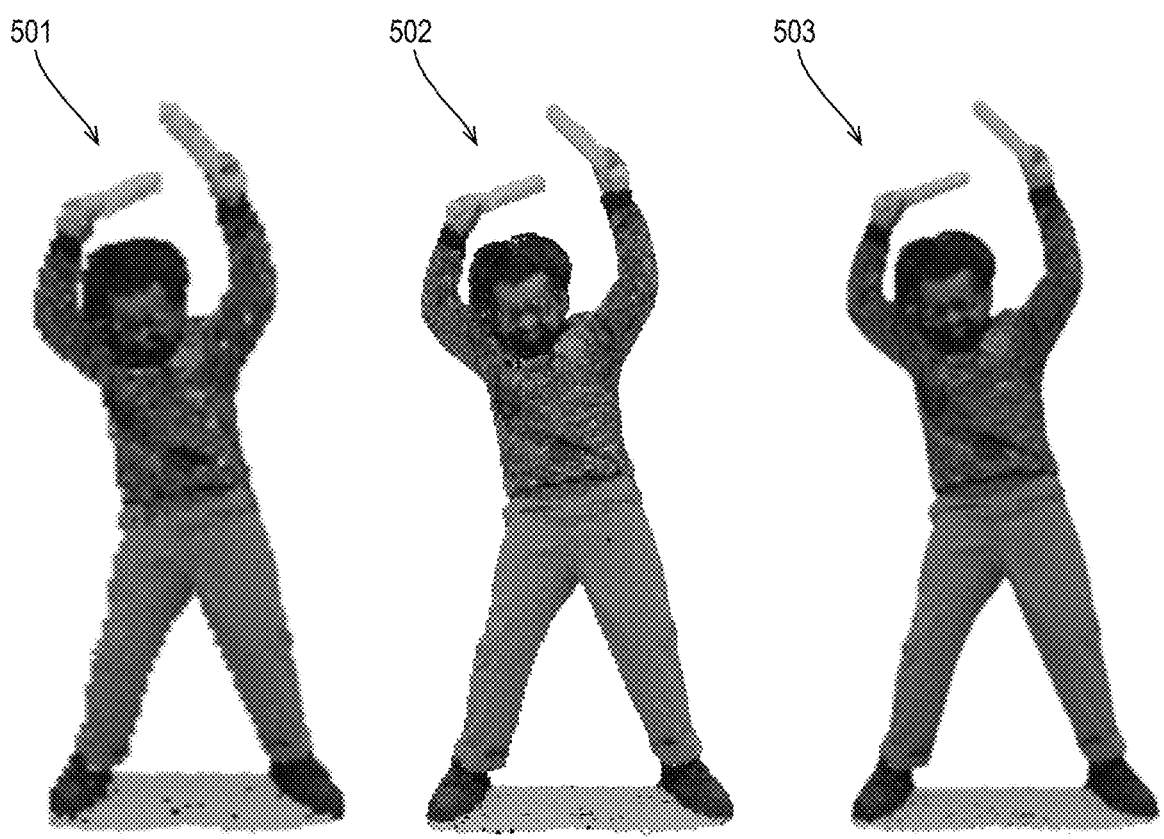
FIG. 5 illustrates exemplary spatial point cloud compression.

FIG. 5 illustrates exemplary spatial point cloud compression 500, arranged in accordance with at least some implementations of the present disclosure. As shown in FIG. 5, first point cloud compression 501 at a first dimension resolution, such as 2 cm resolution, second point cloud compression 502 at a second dimension resolution less than the first dimension resolution, such as 1 cm resolution, and third point cloud compression 503 at a third dimension resolution less than the second dimension resolution, such as 0.5 cm resolution, offer trade-offs in terms of data size and 3D image quality. Notably, less resolution provides for smaller bitstream size while offering less resolution while greater resolution provides for larger bitstream size while offering better resolution. Notably, using the techniques discussed herein, greater compression efficiency may offer both reduced bitstream size at the same resolution.

As discussed, volumetric and color compression module 103 may perform color compression for key frame 113 and delta encoder 105 may perform color residual compression for delta frame 117. In some embodiments, color compression or color residual compression may include determining color values or residual color values 3D points within each 3D block to be compressed, projecting the color values or residual color values onto each of three faces of the 3D block such that the projecting includes combining (e.g., averaging) color values or residual color values for any points that are aligned along the projection, re-projecting the projected color values back so each face to the points such that the re-projecting includes providing the combined (e.g., average) color value or residual color value for those points that were combined, determining errors for each of the projection/re-projections, selecting the lowest error projection that also meets a threshold (e.g., is less than the threshold), and encoding the projected color values or residual color values for the selected lowest error projection (so long as it compares favorably to the threshold). If none of the projection errors compare favorably to the threshold, the color values or residual color values for the 3D points are coded without alteration. Notably, the projected color values or residual color values are on a 2D plane and can be coded by transform to a frequency domain (e.g., discrete cosine transform, wavelet transform, etc.) and optional quantization.

Figure 6:
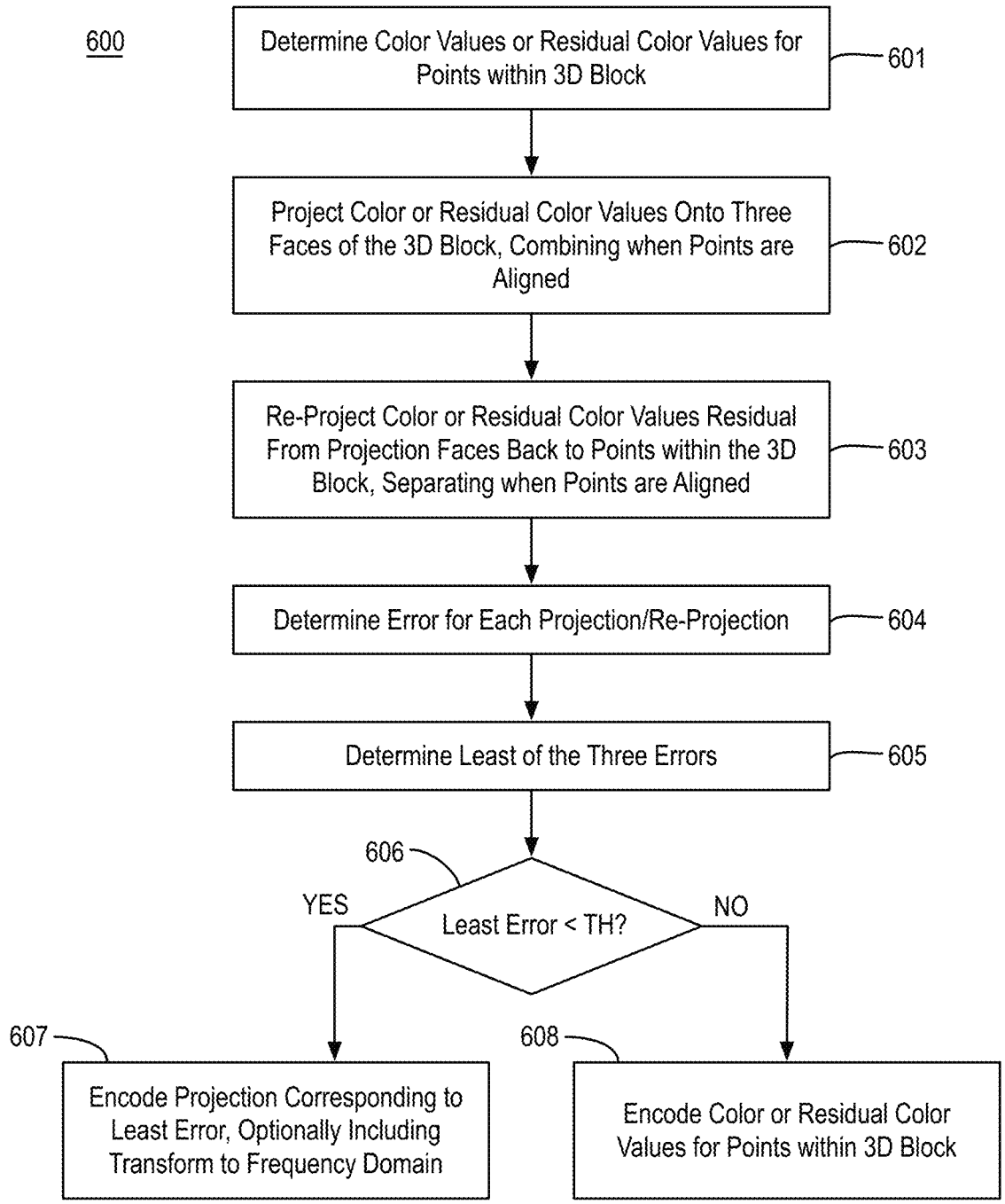
FIG. 6 illustrates an example process for compressing color values or residual values of points of a 3D block.

FIG. 6 illustrates an example process 600 for compressing color values or residual values of points of a 3D block, arranged in accordance with at least some implementations of the present disclosure. Process 600 may include one or more operations 601-608 as illustrated in FIG. 6. Process 600 or portions thereof may be performed by a device or system to compress color values or residual values of points of a 3D block. For example, process 600 may be performed by volumetric and color compression module 103 (for color compression for a key frame) or delta encoder 105 (for color residual compression for a delta frame). Process 600 or portions thereof may be repeated for any number of 3D blocks, frames, etc.

Although discussed with respect to color values and residual color values, process 600 may be implemented for any attribute of points of a 3D point cloud such as spatial displacement, normal vector data, normal vector difference data, or other metadata. The following discussion focuses on color values and residual color values for the sake of clarity of presentation, however, any suitable values may be used.

Process 600 begins at operation 601, where a 3D block is selected and color values or residual color values for points within the 3D block are determined. The 3D block may be any suitable size such as a 4×4×4 block, an 8×8×8 block, a 16×16×16 block, etc. Furthermore, process 600 may be implemented on each 3D block of a point cloud (raw, quantized, or quantized and compressed) or some of such 3D blocks. Each 3D block may be the same size or they may be different sizes. Furthermore, each 3D block may contain any number of points depending on the point density within the block.

Figure 7:
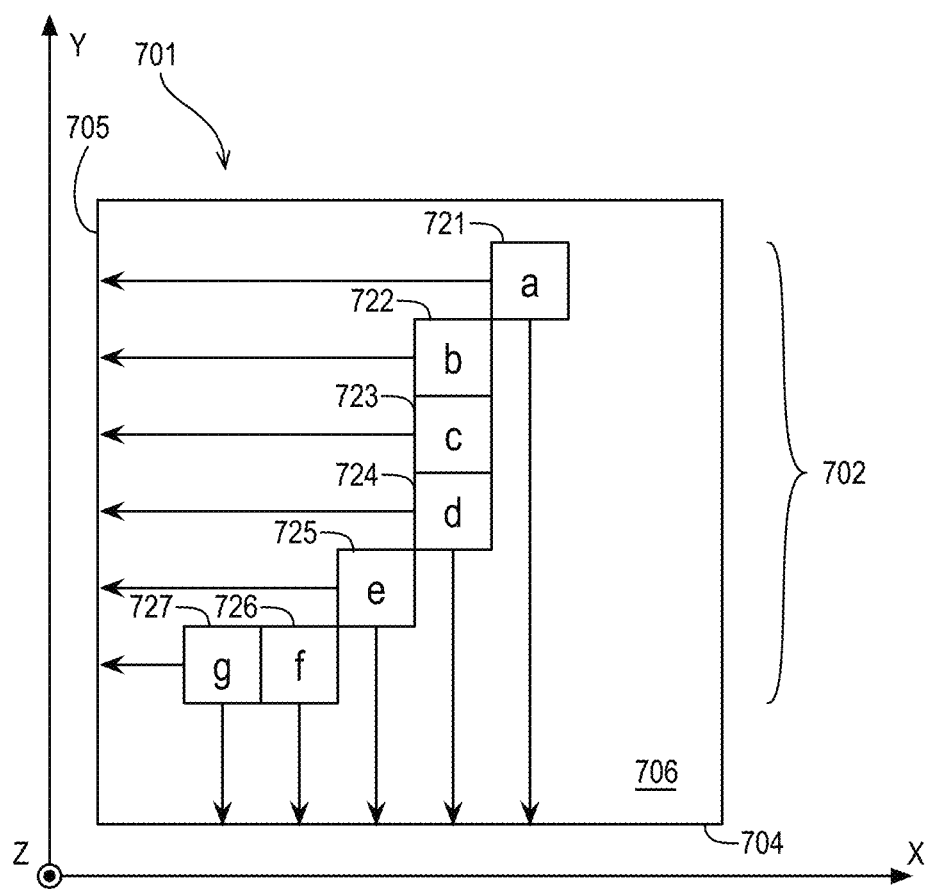
FIG. 7 illustrates block face projections and re-projections of an exemplary 3D block having a plurality of points therein.

FIG. 7 illustrates block face projections and re-projections 700 of an exemplary 3D block 701 having a plurality of points 702 therein, arranged in accordance with at least some implementations of the present disclosure. As shown in FIG. 7, 3D block 701 is in x-y-z space such that 3D block 701 has two x-y faces, one of which is labeled as face 706 (e.g., in the plane of the paper), two x-z faces, one of which is labeled as face 704 (e.g., a plane extending horizontally into and out of the paper), and two y-z faces, one of which is labeled as face 705 (e.g., a plane extending vertically into and out of the paper). Notably, the discussed projection techniques project onto faces 704, 705, 706 and use of opposing faces would be redundant.

Furthermore, 3D block 701 includes therein any number of points 702 of a point cloud as discussed herein. Points 702 may be points of a raw 3D point cloud, a quantized 3D point cloud, or a quantized and volumetrically compressed 3D point cloud. Typically, points 702 have been quantized to a uniform 3D grid. 3D block 701 may include any number of points 702 depending on the point density with 3D block 701. In the illustration of FIG. 7, each of points 702 are illustrated as being on the same x-y plane for the sake of clarity of presentation, but of course points 702 may be distributed in any manner within 3D block 701. Furthermore, points 702 are individually labeled as point 721, point 722, point 723, point 724, point 725, point 726, and point 727.

Furthermore, points 702 have values or sets of values corresponding thereto, which are labeled as a, b, c, d, e, f, g and are representative of color values or residual color values (or other values) for points 702. As shown, point 721 has corresponding value(s) a, point 722 has corresponding value(s) b, point 723 has corresponding value(s) c, point 724 has corresponding value(s) d, point 725 has corresponding value(s) e, point 726 has corresponding value(s) f, and point 727 has corresponding value(s) g. Such values may have one value or a set of values corresponding thereto such as R, G, B color values (or values in another color space), which may be generally described as color channel values or color values, a single luma value, ΔR, ΔG, ΔB color residual value (e.g., or residual color values in another color space), displacement values, normal vector values, normal vector delta values, etc. Notably, any value compressed with respect to a key frame or a delta frame as discussed herein may be used.

Returning to FIG. 6, processing continues at operation 602, where the color values or residual color values (or other values) are projected from the 3D points onto three orthogonal faces of the 3D block. The color values or residual color values (or other values) may be projected using any suitable technique or techniques such that each projection includes combining those points that are aligned along the projection.

For example, with reference to FIG. 7, when projecting points 702 to x-z face 704, the resultant 2D projection (or image) includes values a, e, f, and g of points 721, 725, 726, 727 unchanged and mapped from 3D space to x-z face 704 by eliminating the y-dimension. Notably, the projection direction (e.g., the y-direction) is orthogonal to x-z face 704. Since values b, c, and d correspond to points 722, 723, 724 aligned along the projection direction (e.g., the y-dimension), those values are combined into a single value for a point on x-z face 704. Values for points aligned along a projection direction may be combined using any suitable technique or techniques. In some embodiments, the values are combined using a mean of the values. In such embodiments, the resultant value for the projection to x-z face 704 from values b, c, d of points 722, 723, 724 is then (b+c+d)/3. It is noted that the number of values (or sets of values) is thereby reduced from 7 values (a, b, c, d, e, f, g) in the 3D space to 5 values (a, (b+c+d)/3, e, f, g) in x-z face 704. Thereby, colors (or other attribute) assigned to each of points 702 within 3D block 701 are reduced from N dimensions to N−1 dimensions by projecting points from N to N−1 dimensional "images" by discarding one of N coordinates and averaging points that differ only in the discarded coordinate. In this example, N=3 for the x, y, x dimensions of 3D point clouds and the discarded dimension is the y-dimension.

Similarly, when projecting points 702 to y-z face 705, the resultant 2D projection includes values a, b, c, d, and e of points 721, 722, 723, 724, 725 unchanged and mapped from 3D space to y-z face 704 by eliminating the x-dimension. Since values g and f correspond to points 726, 727 aligned along the projection direction (e.g., the x-dimension), those values are combined into a single value. As discussed, values for points aligned along a projection direction are combined using, for example, a mean of the values. For example, the resultant value for the projection to y-z face 705 from values f and g of aligned points 726, 727 may be (f+g)/2. It is again noted that the number of values is thereby reduced from 7 values (a, b, c, d, e, f, g) in the 3D space to 6 values (a, b, c, d, e, (f+g)/2). Projection to x-y face 706 along the projection direction in the z-dimension is performed in a similar manner.

Returning to FIG. 6, processing continues at operation 603, where the color values or residual color values (or other values) are re-projected back from the three face projections to the 3D points discussed with respect to operation 601. During the re-projection, the color values or residual color values (or other values) are replaced with color values or residual color values (or other values) determined from the three face projections.

For example, with reference to FIG. 7, when re-projecting from x-z face 704 back to points 702, the values for points 721, 725, 726, 727 are unchanged as a, e, f, and g, respectively. For points 722, 723, 724, which are aligned in the projection/re-projection direction (e.g., the y-direction), those points are provided values of the previously combined value corresponding thereto on x-z face 704 (e.g., (b+c+d)/3). Such that, after re-projection, point 721 has a value a, point 722 has a value (b+c+d)/3, point 723 has a value (b+c+d)/3, point 724 has a value (b+c+d)/3, point 725 has a value e, point 726 has a value f, and point 727 has a value g.

Similarly, when re-projecting from y-z face 705 back to points 702, the values for points 721, 722, 723, 724, 725 are unchanged as a, b, c, d, and e, respectively. For points 726, 727, which are aligned in the projection/re-projection direction (e.g., the x-direction), those points are provided values of the previously combined value corresponding thereto on y-z face 705 (e.g., (f+g)/2). Such that, after re-projection, point 721 has a value a, point 722 has a value b, point 723 has a value c, point 724 has a value d, point 725 has a value e, point 726 has a value (f+g)/2, and point 727 has a value (f+g)/2. Re-projection from x-y face 706 to points 702 along the projection/re-projection direction in the z-dimension is performed in a similar manner.

Returning to FIG. 6, processing continues at operation 604, where an error for each of the projection/re-projections is determined based on the initial color values or residual color values (or other values) for the points of the 3D block and the re-projected color values or residual color values (or other values) for the points of the 3D block. The errors may be determined using any suitable technique or techniques such as a sum of squares error metric, a sum of absolute values error metric, etc.

For example, with reference to FIG. 7, the projection/re-projection to x-z face 704 and back to points 702, includes an error of zero for points 721, 725, 726, 727 (e.g., those values were unchanged). For points 722, 723, 724 an error measure measuring the error between b, c, and d, respectively, and (b+c+d)/3 is used. For example, using a sum of squares error metric, the total error for the projection/re-projection to x-z face 704 and back to points 702 is $|b-(b+c+d)/3|^2+|c-(b+c+d)/3|^2+|d-(b+c+d)/3|^2$.

Similarly, the projection/re-projection to y-z face 705 and back to points 702, includes an error of zero for points 721, 722, 723, 724, 725 (e.g., those values were unchanged) and, for points 726, 727 an error measure measuring the error between f and g, respectively, and (g+f)/2 is used. For example, using a sum of squares error metric, the total error for the projection/re-projection to x-z face 704 and back to points 702 is $|g-(g+f)/2|^2+|f-(g+f)/2|^2$. Determining the error from projection/re-projection to x-y face 706 to points 702 along the projection/re-projection direction in the z-dimension is performed in a similar manner.

Processing continues at operation 605, where a least of the three errors determined at operation 604 is selected. Notably, the projections associated with the other two errors are discarded from consideration in coding the color values or residual color values (or other values) of the 3D block. Processing continues at decision operation 606, where a determination is made as to whether the error selected at operation 605 compares favorably to a threshold. As used herein with respect to threshold, the term compares favorably to indicate the test pertaining to the threshold is achieved. For example, the error may be less than a threshold to achieve the pertinent test or less than or equal to a threshold to achieve the pertinent test. The threshold implemented at operation 606 may be any suitable threshold and may be based on the size of the 3D block.

If the least of the errors compares favorably to the threshold, processing continues at operation 607, where the projection corresponding to the least of the errors along with a block descriptor indicating the projection dimension is encoded for the 3D block. Notably, such coding is lossy as the (acceptable) error indicates. The encoding performed at operation 607 may include any suitable technique or techniques used to encode 2D color values or residual color values (or other values) such as transform to the frequency domain, quantization, etc. The transform to the frequency domain may include any suitable transform such as a discrete cosine transform (DCT) operation, a wavelet transform operation, etc.

If the least of the errors compares unfavorably to the threshold, processing continues at operation 608, where the initial color values or residual color values (or other values) for points of the 3D block are encoded. In some embodiments, the color values or residual color values (or other values) are encoded as discussed with respect to FIG. 4.

Figure 8:
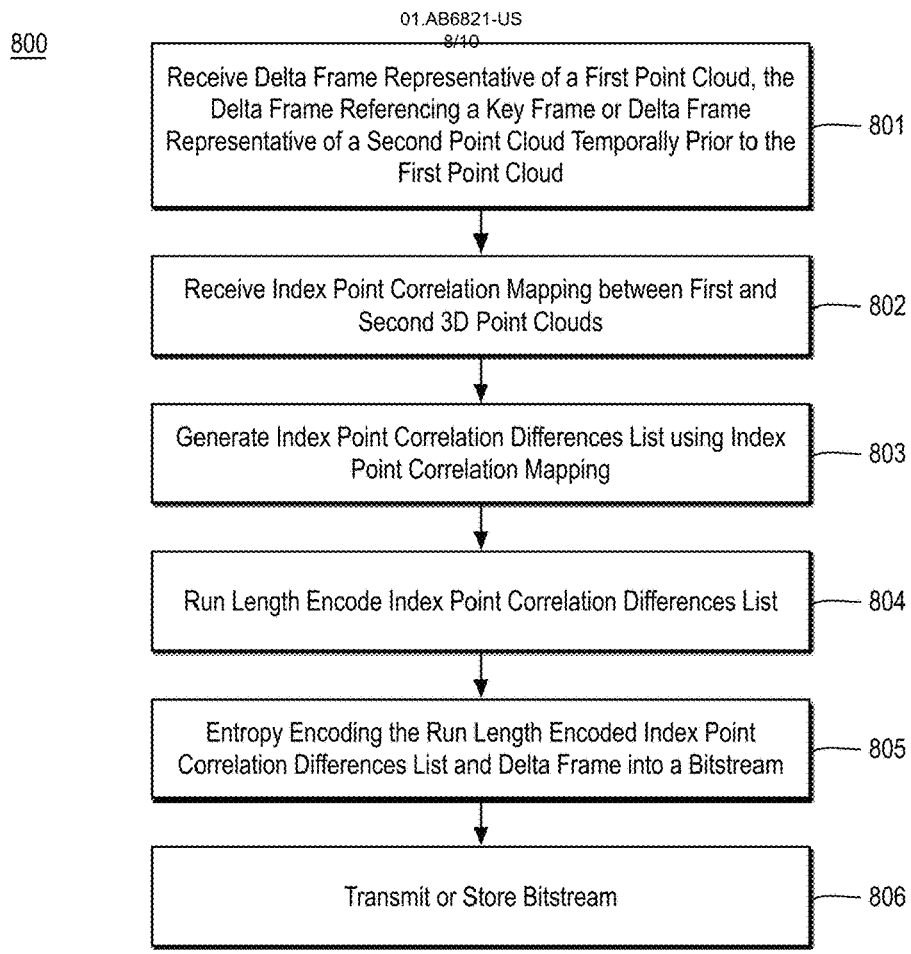
FIG. 8 is a flow diagram illustrating an example process for compressing 3D video.

FIG. 8 is a flow diagram illustrating an example process 800 for compressing 3D video, arranged in accordance with at least some implementations of the present disclosure. Process 800 may include one or more operations 801-806 as illustrated in FIG. 8. Process 800 may form at least part of a 3D video coding process. By way of non-limiting example, process 800 may form at least part of a 3D video coding process as performed by any device or system as discussed herein such as system 100. Furthermore, process 800 will be described herein with reference to system 900 of FIG. 9.

Figure 9:
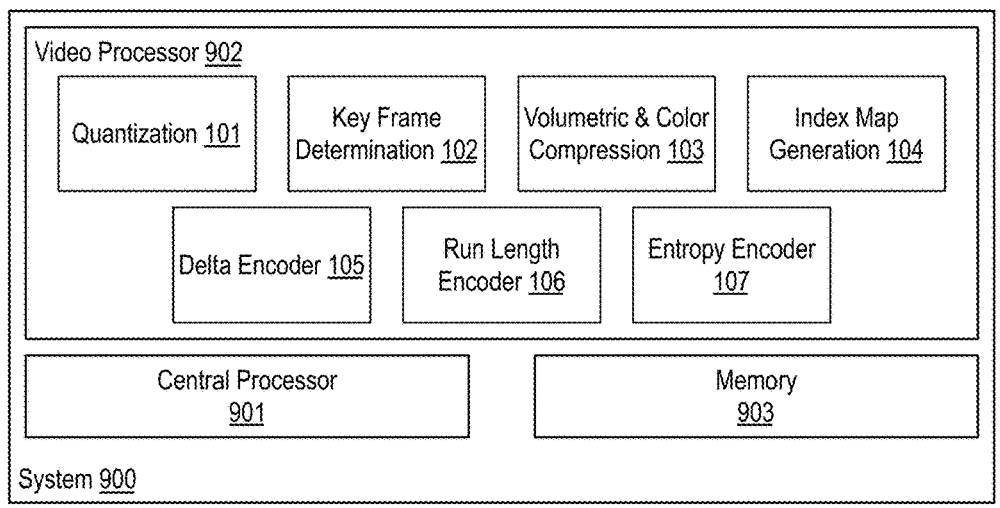
FIG. 9 is an illustrative diagram of an example system for compressing 3D video.

FIG. 9 is an illustrative diagram of an example system 900 for compressing 3D video, arranged in accordance with at least some implementations of the present disclosure. As shown in FIG. 9, system 900 may include a central processor 901, a video processor 902, and a memory 903. Also as shown, video processor 902 may include or implement quantization module 101, key frame determination module 102, volumetric and color compression module 103, index map generation module 104, delta encoder 105, run length encoder 106, and entropy encoder 107. Furthermore, in the example of system 900, memory 903 may store 3D video data or related content such as 3D point clouds, index values, index value correlations, delta data, color or residual color data, displacement data, bitstream data, and/or any other data as discussed herein.

As shown, in some embodiments, quantization module 101, key frame determination module 102, volumetric and color compression module 103, index map generation module 104, delta encoder 105, run length encoder 106, and entropy encoder 107 are implemented via video processor 902. In other embodiments, one or more or portions of quantization module 101, key frame determination module 102, volumetric and color compression module 103, index map generation module 104, delta encoder 105, run length encoder 106, and entropy encoder 107 are implemented via central processor 901 or another processing unit such as an image processor, a graphics processor, or the like.

Video processor 902 may include any number and type of video, image, or graphics processing units that may provide the operations as discussed herein. Such operations may be implemented via software or hardware or a combination thereof. For example, video processor 902 may include circuitry dedicated to 3D frames, point cloud data, or the like obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, one or more or portions of quantization module 101, key frame determination module 102, volumetric and color compression module 103, index map generation module 104, delta encoder 105, run length encoder 106, and entropy encoder 107 are implemented via an execution unit (EU). The EU may include, for example, programmable logic or circuitry such as a logic core or cores that may provide a wide array of programmable logic functions. In an embodiment, one or more or portions of quantization module 101, key frame determination module 102, volumetric and color compression module 103, index map generation module 104, delta encoder 105, run length encoder 106, and entropy encoder 107 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 begins at operation 801, where a delta frame representative of a first 3D point cloud for a current time instance is received such that the delta frame references a key frame representative of a second 3D point cloud for a previous time instance and such that each point of the first 3D point cloud has a delta frame index value and each point of the second 3D point cloud has a key frame index value. The first and second point cloud may be any point clouds discussed herein. In an embodiment, each point of the first 3D point cloud corresponds to a quantized and coded point of a first raw 3D point cloud and each point of the second 3D point cloud corresponds to a quantized and coded point of a second raw 3D point cloud.

The delta frame and key frame may be generated using any suitable technique or techniques discussed herein. In an embodiment, the delta frame includes a spatial displacement for each of the matching ones of the key frame index values, each spatial displacement comprising 3D displacement between the point of the second 3D point cloud for the matching one of the key frame index value and the point of the first 3D point cloud for the matching one of the delta frame index values. In an embodiment, the delta frame includes a color residual for at least one of the matching ones of the key frame index values, the color residual comprising color channel residual values between color channel values corresponding to the point of the second 3D point cloud for the matching one of the key frame index value and the point of the first 3D point cloud for the matching one of the delta frame index values.

In an embodiment, process 800 further includes generating the key frame by color compressing a 3D block corresponding to the key frame by determining color values for each of a plurality of points within the 3D block, projecting the color values onto a first face and a second face of the 3D block, wherein said projecting the color values onto the first face comprises combining color values for two of the plurality of points that are aligned with a direction orthogonal to the first face, projecting the color values from the first face back to the plurality of points and determining a first error corresponding thereto, projecting the color values from the second face back to the plurality of points and determining a second error corresponding thereto, and encoding, in response to the first error being less than the second error and less than a threshold, the projected color values of the first face for the 3D block. In an embodiment, encoding the projected color values of the first face for the 3D block includes transforming the projected color values of the first face to the frequency domain. In an embodiment, when the first error and the second error exceed the threshold, the color values for each of the plurality of points are encoded for the 3D block.

In an embodiment, process 800 further includes generating the delta frame by color compressing a 3D block corresponding to the delta frame by determining residual color values for each of a plurality of points within the 3D block, projecting the residual color values onto a first face and a second face of the 3D block by eliminating one spatial dimension of each of the plurality of points for each projection and combining any residual color values for points aligned along the eliminated spatial dimension, projecting the color values from the first and second faces back to the plurality of points and determining first and second errors corresponding thereto, and encoding, in response to the first error being less than the second error and less than a threshold, the projected residual color values of the first face for the 3D block or encoding, in response to the first and second errors both exceeding the threshold, the residual color values for the 3D block. In an embodiment, encoding the projected residual color values of the first face for the 3D block includes applying a discrete cosine transform to the projected residual color values.

Processing continues at operation 802, where an index point correlation mapping between the first and second 3D point clouds is received such that the index point correlation mapping includes at least a plurality of index point correlations, each of the plurality of index point correlations matching one of the delta frame index values with a matching one of the key frame index values. In an embodiment, the plurality of index point correlations includes a first subset of index point correlations having equivalent delta frame and key frame index values run length encoded (as discussed with respect to operation 804) as a run of zeros, a second subset of index point correlations having different delta frame and key frame index values run length encoded (as discussed with respect to operation 804) as the difference between the delta frame and key frame index values, and a plurality of delta frame index values each matched to a particular value indicative of no matching point in the second point cloud.

Processing continues at operation 803, where an index point correlation differences list is generated by differencing each of the index point correlations. For example, the differencing of each of the index point correlations includes a pairwise differencing such that one member of the pair is differenced from the other member. As discussed herein, such pairwise differencing may provide for extended runs of zeros and/or the same numbers in the index point correlation differences list.

Processing continues at operation 804, where the index point correlation differences list is run length encoded to generate a run length encoded index point correlation differences list. As discussed, run length encoding provides lossless data compression where runs of values (e.g., sequences having the same value) are encoded as a single value and a count of the number of values. By explicitly run length encoding the index point correlation differences list, the extended runs of zeros and/or the same numbers in the index point correlation differences list are efficiently compressed.

Processing continues at operation 805, where the run length encoded index point correlation differences list and the delta frame are entropy encoded into a bitstream. The entropy encoding may be performed using any suitable technique or techniques where codewords are provided for each unique symbol in the index point correlation differences list and the delta frame and the symbols are replaced with the codewords during coding.

Processing continues at operation 806, where the bitstream is transmitted and/or stored. The bitstream may be transmitted and/or stored using any suitable technique or techniques. In an embodiment, the bitstream is stored in a local memory such as memory 903. In an embodiment, the bitstream is transmitted for storage at a hosting device such as a server. In an embodiment, the bitstream is transmitted by system 900 or a server for use by a decoder device. As used herein, the term transmitted indicates the pertinent data is transmitted to another device, to local memory, to processing for display, or the like.

Process 800 may be repeated any number of times either in series or in parallel for any number frames, 3D point, clouds, etc. As discussed, process 800 may provide for 3D video encoding including coding of an index point correlation mapping between the first and second 3D point clouds.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
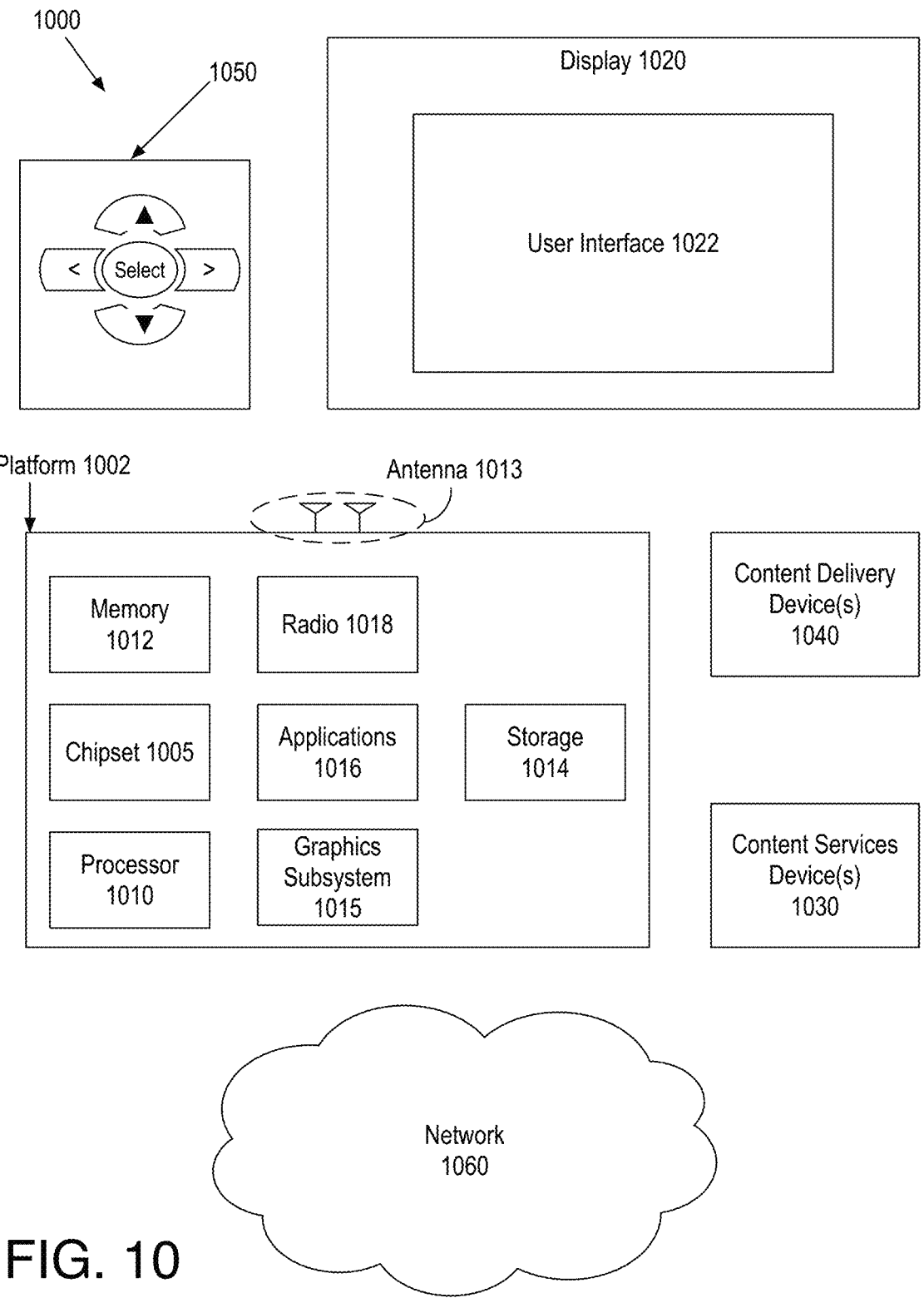
FIG. 10 is an illustrative diagram of an example system.

FIG. 10 is an illustrative diagram of an example system 1000, arranged in accordance with at least some implementations of the present disclosure. In various implementations, system 1000 may be a mobile system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth.

When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
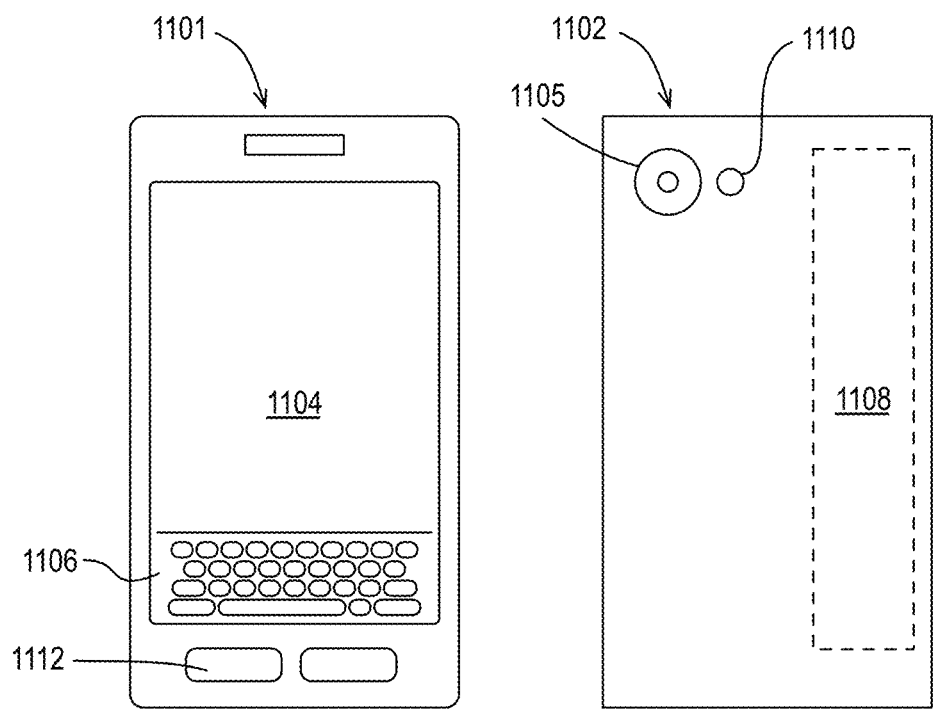
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, system 100 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for compressing 3D video comprising:
   memory to store first and second point clouds for a current and a previous time instance, respectively; and
   a processor coupled to the memory, the processor to:
      receive a delta frame representative of the first 3D point cloud, wherein the delta frame references a key frame representative of the second 3D point cloud, wherein each point of the first 3D point cloud has a delta frame index value and each point of the second 3D point cloud has a key frame index value;
      receive an index point correlation mapping between the first and second 3D point clouds, wherein the index point correlation mapping comprises at least a plurality of index point correlations, each of the plurality of index point correlations matching one of the delta frame index values with a matching one of the key frame index values;
      generate an index point correlation differences list by differencing each of the index point correlations;
      run length encode the index point correlation differences list to generate a run length encoded index point correlation differences list; and
      entropy encode the run length encoded index point correlation differences list and the delta frame into a bitstream.

2. The system of claim 1, wherein the index point correlation mapping provides an injective mapping between the first and second 3D point clouds, the plurality of index point correlations comprises a first subset of index point correlations having equivalent delta frame and key frame index values run length encoded as a run of zeros, a second subset of index point correlations having different delta frame and key frame index values run length encoded as the difference between the delta frame and key frame index values, and a plurality of delta frame index values each matched to a particular value indicative of no matching point in the second point cloud.

3. The system of claim 1, wherein each point of the first 3D point cloud corresponds to a quantized and coded point of a first raw 3D point cloud and each point of the second 3D point cloud corresponds to a quantized and coded point of a second raw 3D point cloud.

4. The system of claim 1, wherein the delta frame comprises a spatial displacement for each of the matching ones of the key frame index values, each spatial displacement comprising 3D displacement between the point of the second 3D point cloud for the matching one of the key frame index value and the point of the first 3D point cloud for the matching one of the delta frame index values.

5. The system of claim 1, wherein the delta frame comprises a color residual for at least one of the matching ones of the key frame index values, the color residual comprising color channel residual values between color channel values corresponding to the point of the second 3D point cloud for the matching one of the key frame index value and the point of the first 3D point cloud for the matching one of the delta frame index values.

6. The system of claim 1, further comprising the processor to generate the key frame by color compression of a 3D block corresponding to the key frame, the color compression comprising the processor to:
  determine color values for each of a plurality of points within the 3D block;
  project the color values onto a first face and a second face of the 3D block, wherein said projection of the color values onto the first face comprises the processor to combine color values for two of the plurality of points that are aligned with a direction orthogonal to the first face;
  project the color values from the first face back to the plurality of points and determine a first error corresponding thereto;
  project the color values from the second face back to the plurality of points and determine a second error corresponding thereto; and
  encode, in response to the first error being less than the second error and less than a threshold, the projected color values of the first face for the 3D block.

7. The system of claim 6, wherein the processor to encode the projected color values of the first face for the 3D block comprises the processor to transform the projected color values of the first face to the frequency domain.

8. The system of claim 6, wherein, when the first error and the second error exceed the threshold, the color values for each of the plurality of points are encoded for the 3D block.

9. The system of claim 1, wherein further comprising the processor to generate the delta frame by color compression a 3D block corresponding to the delta frame, the color compression comprising the processor to:
  determine residual color values for each of a plurality of points within the 3D block;
  project the residual color values onto a first face and a second face of the 3D block by eliminating one spatial dimension of each of the plurality of points for each projection and combining any residual color values for points aligned along the eliminated spatial dimension;
  project the color values from the first and second faces back to the plurality of points and determining first and second errors corresponding thereto; and
  encode, in response to the first error being less than the second error and less than a threshold, the projected residual color values of the first face for the 3D block, or
  encode, in response to the first and second errors both exceeding the threshold, the residual color values for the 3D block.

10. The system of claim 9, wherein the processor to encode the projected residual color values of the first face for the 3D block comprises the processor to apply a discrete cosine transform to the projected residual color values.

11. A method for compressing 3D video comprising:
  receiving a delta frame representative of a first 3D point cloud for a current time instance, wherein the delta frame references a key frame representative of a second 3D point cloud for a previous time instance, wherein each point of the first 3D point cloud has a delta frame index value and each point of the second 3D point cloud has a key frame index value;
  receiving an index point correlation mapping between the first and second 3D point clouds, wherein the index point correlation mapping comprises at least a plurality of index point correlations, each of the plurality of index point correlations matching one of the delta frame index values with a matching one of the key frame index values;
  generating an index point correlation differences list by differencing each of the index point correlations;
  run length encoding the index point correlation differences list to generate a run length encoded index point correlation differences list; and
  entropy encoding the run length encoded index point correlation differences list and the delta frame into a bitstream.

12. The method of claim 11, wherein the index point correlation mapping provides an injective mapping between the first and second 3D point clouds, the plurality of index point correlations comprises a first subset of index point correlations having equivalent delta frame and key frame index values run length encoded as a run of zeros, a second subset of index point correlations having different delta frame and key frame index values run length encoded as the difference between the delta frame and key frame index values, and a plurality of delta frame index values each matched to a particular value indicative of no matching point in the second point cloud.

13. The method of claim 11, wherein the delta frame comprises a spatial displacement for each of the matching ones of the key frame index values, each spatial displacement comprising 3D displacement between the point of the second 3D point cloud for the matching one of the key frame index value and the point of the first 3D point cloud for the matching one of the delta frame index values.

14. The method of claim 11, wherein the delta frame comprises a color residual for at least one of the matching ones of the key frame index values, the color residual comprising color channel residual values between color channel values corresponding to the point of the second 3D point cloud for the matching one of the key frame index value and the point of the first 3D point cloud for the matching one of the delta frame index values.

15. The method of claim 11, further comprising generating the key frame by color compressing a 3D block corresponding to the key frame by:
  determining color values for each of a plurality of points within the 3D block;
  projecting the color values onto a first face and a second face of the 3D block, wherein said projecting the color values onto the first face comprises combining color values for two of the plurality of points that are aligned with a direction orthogonal to the first face;
  projecting the color values from the first face back to the plurality of points and determining a first error corresponding thereto;
  projecting the color values from the second face back to the plurality of points and determining a second error corresponding thereto; and
  encoding, in response to the first error being less than the second error and less than a threshold, the projected color values of the first face for the 3D block.

16. The method of claim 11 further comprising generating the delta frame by color compressing a 3D block corresponding to the delta frame by:
  determining residual color values for each of a plurality of points within the 3D block;
  projecting the residual color values onto a first face and a second face of the 3D block by eliminating one spatial dimension of each of the plurality of points for each projection and combining any residual color values for points aligned along the eliminated spatial dimension;

projecting the color values from the first and second faces back to the plurality of points and determining first and second errors corresponding thereto; and encoding, in response to the first error being less than the second error and less than a threshold, the projected residual color values of the first face for the 3D block, or encoding, in response to the first and second errors both exceeding the threshold, the residual color values for the 3D block.

17. At least one non-transitory machine readable medium comprising a plurality of instructions that, in response to being executed on a computing device, cause the computing device to compress 3D video by:

receiving a delta frame representative of a first 3D point cloud for a current time instance, wherein the delta frame references a key frame representative of a second 3D point cloud for a previous time instance, wherein each point of the first 3D point cloud has a delta frame index value and each point of the second 3D point cloud has a key frame index value;

receiving an index point correlation mapping between the first and second 3D point clouds, wherein the index point correlation mapping comprises at least a plurality of index point correlations, each of the plurality of index point correlations matching one of the delta frame index values with a matching one of the key frame index values;

generating an index point correlation differences list by differencing each of the index point correlations;

run length encoding the index point correlation differences list to generate a run length encoded index point correlation differences list; and entropy encoding the run length encoded index point correlation differences list and the delta frame into a bitstream.

18. The non-transitory machine readable medium of claim 17, wherein the index point correlation mapping provides an injective mapping between the first and second 3D point clouds, the plurality of index point correlations comprises a first subset of index point correlations having equivalent delta frame and key frame index values run length encoded as a run of zeros, a second subset of index point correlations having different delta frame and key frame index values run length encoded as the difference between the delta frame and key frame index values, and a plurality of delta frame index values each matched to a particular value indicative of no matching point in the second point cloud.

19. The non-transitory machine readable medium of claim 17, wherein the delta frame comprises a spatial displacement for each of the matching ones of the key frame index values, each spatial displacement comprising 3D displacement between the point of the second 3D point cloud for the matching one of the key frame index value and the point of the first 3D point cloud for the matching one of the delta frame index values.

20. The non-transitory machine readable medium of claim 17, wherein the delta frame comprises a color residual for at least one of the matching ones of the key frame index values, the color residual comprising color channel residual values between color channel values corresponding to the point of the second 3D point cloud for the matching one of the key frame index value and the point of the first 3D point cloud for the matching one of the delta frame index values.

21. The non-transitory machine readable medium of claim 17, comprising further instructions that, in response to being executed on the computing device, cause the computing device to generate the key frame by color compressing a 3D block corresponding to the key frame by:

determining color values for each of a plurality of points within the 3D block;

projecting the color values onto a first face and a second face of the 3D block, wherein said projecting the color values onto the first face comprises combining color values for two of the plurality of points that are aligned with a direction orthogonal to the first face;

projecting the color values from the first face back to the plurality of points and determining a first error corresponding thereto;

projecting the color values from the second face back to the plurality of points and determining a second error corresponding thereto; and encoding, in response to the first error being less than the second error and less than a threshold, the projected color values of the first face for the 3D block.

22. The non-transitory machine readable medium of claim 17, comprising further instructions that, in response to being executed on the computing device, cause the computing device to generate the delta frame by color compressing a 3D block corresponding to the key frame by:

determining residual color values for each of a plurality of points within the 3D block;

projecting the residual color values onto a first face and a second face of the 3D block by eliminating one spatial dimension of each of the plurality of points for each projection and combining any residual color values for points aligned along the eliminated spatial dimension;

projecting the color values from the first and second faces back to the plurality of points and determining first and second errors corresponding thereto; and encoding, in response to the first error being less than the second error and less than a threshold, the projected residual color values of the first face for the 3D block, or encoding, in response to the first and second errors both exceeding the threshold, the residual color values for the 3D block.

* * * * *